United States Patent
Tintillier et al.

(10) Patent No.: US 12,304,872 B2
(45) Date of Patent: May 20, 2025

(54) METHOD FOR PRODUCING A COMPOSITE INSULATING MINERAL CONSTRUCTION ELEMENT

(71) Applicant: HOLCIM TECHNOLOGY LTD, Zug (CH)

(72) Inventors: Patrick Tintillier, Holderbank (CH); Nicolas Perez, Holderbank (CH); Florence Serre, Holderbank (CH)

(73) Assignee: HOLCIM TECHNOLOGY LTD, Zug (CH)

( * ) Notice: Subject to any disclaimer, the term of this patent is extended or adjusted under 35 U.S.C. 154(b) by 270 days.

(21) Appl. No.: 18/044,932

(22) PCT Filed: Sep. 17, 2021

(86) PCT No.: PCT/EP2021/075695
§ 371 (c)(1),
(2) Date: Mar. 10, 2023

(87) PCT Pub. No.: WO2022/058544
PCT Pub. Date: Mar. 24, 2022

(65) Prior Publication Data
US 2023/0357092 A1  Nov. 9, 2023

(30) Foreign Application Priority Data
Sep. 18, 2020 (EP) .................................... 20306064

(51) Int. Cl.
*C04B 38/10* (2006.01)
*C04B 22/14* (2006.01)
(Continued)

(52) U.S. Cl.
CPC ............ *C04B 38/10* (2013.01); *C04B 22/148* (2013.01); *C04B 24/10* (2013.01); *C04B 28/04* (2013.01);
(Continued)

(58) Field of Classification Search
CPC ........ C04B 38/10; C04B 22/148; C04B 24/10; C04B 28/04; C04B 2111/00698;
(Continued)

(56) References Cited

U.S. PATENT DOCUMENTS

| 2015/0083958 A1* | 3/2015 | Bernardi | C04B 38/10 |
| | | | 252/62 |
| 2016/0215069 A1 | 7/2016 | Stern et al. | |
| 2018/0016356 A1* | 1/2018 | Savonnet | C08L 3/02 |

FOREIGN PATENT DOCUMENTS

| DE | 10 2016 001930 A1 | 8/2017 |
| EP | 1 316 563 A1 | 6/2003 |

(Continued)

OTHER PUBLICATIONS

International Search Report as issued in International Patent Application No. PCT/EP2021/075695, dated Dec. 22, 2021.

*Primary Examiner* — Mark R Wendell
(74) *Attorney, Agent, or Firm* — Pillsbury Winthrop Shaw Pittman LLP

(57) ABSTRACT

A method for producing a composite insulating mineral construction element includes filling the cavity of a construction element including at least one cavity delimited by at least one inner wall at least partially having a water absorption rate of more than 5 g/(m²·s) at 10 minutes according to standard NF EN 772-11 of August 2011 with a foamed cement slurry including a cement being an hydraulic binder including a proportion of at least 50% by weight of calcium oxide CaO and silicone dioxide $SiO_2$, a metal salt selected from an aluminium, magnesium or iron salt and mixtures thereof, and a cellulose ether; and leaving the foamed cement slurry to set within the cavity resulting in the formation of a mineral foam, wherein the foamed cement (Continued)

slurry includes from 0.01 to 0.2% by weight of cellulose ether, relative to the weight of cement.

20 Claims, 4 Drawing Sheets

(51) Int. Cl.
*C04B 24/10* (2006.01)
*C04B 28/04* (2006.01)
*E04B 1/76* (2006.01)
*C04B 111/00* (2006.01)
*C04B 111/40* (2006.01)

(52) U.S. Cl.
CPC ... *E04B 1/7604* (2013.01); *C04B 2111/00698* (2013.01); *C04B 2111/40* (2013.01); *C04B 2201/20* (2013.01); *C04B 2201/30* (2013.01)

(58) Field of Classification Search
CPC .............. C04B 2111/40; C04B 2201/20; C04B 2201/30; E04B 1/7604; E04B 2/049; E04C 1/41
See application file for complete search history.

(56) References Cited

FOREIGN PATENT DOCUMENTS

| | | |
|---|---|---|
| JP | H05-139864 A | 6/1993 |
| WO | WO 2013/150148 A1 | 10/2013 |
| WO | WO 2014/072533 A1 | 5/2014 |
| WO | WO 2015/150550 A1 | 10/2015 |
| WO | WO 2017/093795 A1 | 6/2017 |
| WO | WO 2017/093797 A1 | 6/2017 |
| WO | WO 2020/039023 A1 | 2/2020 |

\* cited by examiner

METHOD FOR PRODUCING A COMPOSITE INSULATING MINERAL CONSTRUCTION ELEMENT

CROSS-REFERENCE TO RELATED APPLICATIONS

This application is the U.S. National Stage of International Application Serial No. PCT/EP2021/075695, filed Sep. 17, 2021, which in turn claims priority to European Application No. 20306064.5, filed Sep. 18, 2020. The contents of all of these applications are incorporated herein by reference in their entirety.

FIELD OF THE INVENTION

The present invention concerns a method for producing a composite insulating mineral construction element and the composite insulating mineral construction element obtained with said method.

BACKGROUND OF THE INVENTION

Mineral foams are used in many technological applications. Due to their low thermal conductivity, good heat and fire resistance, and acoustic properties, this type of material is suitable for insulation applications in building construction and renovation.

Mineral foams may particularly be used to improve the thermal and acoustic properties of construction element comprising a hollow portion, for example small constructions elements such as brick or concrete blocks or larger scale construction elements such as precast paving blocks, sandwich panels, or double walls.

The process comprises arranging a fresh foamed cement slurry inside the hollow portion of the construction element to be insulated, the fresh foamed cement slurry first coming to adjust to the form of the hollow portion envelope, and then setting thus developing its desired insulating properties. The composite construction element thus obtained comprises the initial construction element the hollow portion of which is filled with mineral foam (the mineral foam is the result of setting of foamed cement slurry). Depending on the situation, this process can be carried out at the factory or directly on the building construction site.

However, foamed cement slurries have a tendency to collapse, destabilize and shrink when hardening. The resulting mineral foam has a tendency to detach from the cavity walls, to the detriment of the aesthetic, thermal and acoustic properties of the obtained composite construction elements.

A difficulty in the preparation of a construction element filled with foamed cement slurry is therefore to produce stable foamed cement slurries which are not subject to these problems.

A further difficulty is that the stability of the foamed cement slurry depends on the water absorption rate of the cell walls which are in contact with the foamed cement slurry.

Indeed, it was shown in WO 2015/150550 that the collapse of foamed cement slurries highly depends on the water absorption rate of the block cell inner walls which are in contact with the foamed cement slurry. Thus, WO 2015/150550 provides a method wherein the construction block cell inner walls are arranged covering it with appropriate hydrophobic compounds or moistening the inner walls for example using water prior to the foamed cement slurry injection, so that they present a water absorption rate below a certain threshold.

Another solution for pouring foamed cement slurries into construction elements consists in decreasing the water absorption rate of the internal cell walls of a construction element, for instance by pouring the foamed cement slurries into block in a fresh state. This solution is suitable for manufacturing block filled with mineral foam since the block in a fresh state can be filled with foamed cement slurry in a precast plant but is less suitable for manufacturing directly on site.

However, these solutions may prove to be technically complex, as adjusting the water absorption rate of the internal cell walls of a construction element to be treated may depend on the material from which the construction element is made.

Besides, in WO 2017/03797, an ultralight foam comprising an aluminium salt as a foam stabilizer is provided. The Applicant shows that the use of an aluminium salt such as aluminium sulphate reduces the average size of the air bubbles embedded in the foam, which is known to be associated with an increased stability. However, stability tests are carried out on cavities whose envelope is made of waterproof polystyrene, and the stability of this ultralight foam depending on the water absorption rate of the cell walls is not explored.

Therefore, there is a need for an improved method allowing to obtain composite construction elements even when the construction element is porous or comprises porous part without implementing the additional step of decreasing the water absorption rate of the inner surfaces of their hollow portion.

SUMMARY OF THE INVENTION

The present invention aims to solve prior art problems, by providing improved method to obtain composite construction elements. The invention also relates to the use of a combination of a metal salt and a cellulose ether for improving the stability of a foamed cement slurry when it comes into contact with a material having a water absorption rate of more than 5 g/(m²·s) at 10 minutes according to standard NF EN 772-11 of august 2011 and to a composite insulating mineral construction element obtained by the method according to the invention.

More specifically, an object of the present invention relates to a method for producing a composite insulating mineral construction element comprising the following steps:
   a) filling the cavity of a construction element comprising at least one cavity delimited by at least one inner wall at least partially having a water absorption rate of more than 5 g/(m2·s) at 10 minutes according to standard NF EN 772-11 of august 2011 with a foamed cement slurry comprising a cement being an hydraulic binder comprising a proportion of at least 50% by weight of calcium oxide CaO and silicone dioxide $SiO_2$, a metal salt selected from an aluminium, magnesium or iron salt and mixtures thereof, and a cellulose ether;
   b) leaving the foamed cement slurry to set within the cavity resulting in the formation of a mineral foam;
wherein the foamed cement slurry comprises from 0.01 to 0.2% by weight of cellulose ether, relative to the weight of cement.

The foamed cement slurry advantageously comprises from 0.01 to 0.1% by weight of cellulose ether, relative to the weight of cement.

Advantageously, the cellulose ether is a an anionic cellulose ether such as carboxymethyl cellulose (CMC), carboxymethyl hydroxyethyl cellulose (CMHEC), carboxymethyl hydroxypropyl cellulose (CMHPC), sulfoethyl methyl hydroxyethyl cellulose (SEMHEC), sulfoethyl methyl hydroxypropyl cellulose (SEMHPC) or a nonionic cellulose ether such as hydroxyethyl cellulose (HEC), hydroxypropyl cellulose (HPC), methyl cellulose (MC), methyl hydroxypropyl cellulose (MHPC), methyl hydroxyethyl cellulose (MHEC), ethyl hydroxyethyl cellulose (EHEC) or methyl ethyl hydroxyethyl cellulose (MEHEC) or a mixture thereof.

Advantageously, the cellulose ether is a cellulose ether having a viscosity level comprised between 100 mPa·s to 5000 mPa·s, advantageously a viscosity ranging between 300 mPa·s to 1500 mPa·s.

Advantageously, the cellulose ether is a cellulose ether with delayed solubility.

Advantageously, the foamed cement slurry comprises 0.05% to 5% by weight, advantageously 0.15% to 1.5% by weight of metal salt, relative to the weight of cement.

Advantageously, the metal salt is a salt of aluminium, preferably is aluminium sulphate.

Advantageously, the foamed cement slurry used in step a) is obtained by a process comprising:
  (i) separately preparing a cement slurry and an aqueous foam;
  (ii) contacting the cement slurry with the aqueous foam to obtain a foamed cement slurry;
  Wherein:
    the cement slurry of step (i) comprises the metal salt, and
    the cellulose ether is comprised within the cement slurry of step (i) and/or is within the aqueous foam of step (i) and/or is added to the foamed cement slurry obtained in step (ii).

Advantageously, the cement slurry of step (i) comprises cement and water with a weight water/cement ratio ranging between 0.25 to 0.5, more preferably from 0.28 to 0.45, even more preferably from 0.29 to 0.45, 0.45.

Advantageously, the method comprises a step (iii) of adding a mixture comprising metal salt, cellulose ether and water in the foamed cement slurry obtained in step (ii).

Said mixture advantageously comprises cellulose ether in the form of particles having an average particle size of 125 μm or less.

Advantageously, the mineral foam obtained after step b) has one or many of the following features:
  The mineral foam has a density of less than 600 m3/kg, preferably a density ranging from 35 to 500 m3/kg;
  The mineral foam comprises from 0.01% to 0.2% by weight of cellulose ether, advantageously 0.01% to 0.1% by weight of cellulose ether, relative to the weight of cement;
  The mineral foam comprises 0.15% to 5% by weight, advantageously 0.15%-3% by weight, more advantageously 0.15% to 1.5% by weight of metal salt, relative to the weight of cement.

Preferably, the mineral construction element is advantageously selected from a concrete block, a brick, a double wall, a sandwich panel, a 3D construction wall.

The invention further relates to the use of a combination of a metal salt as defined above and a cellulose ether as defined above with a cement being an hydraulic binder comprising a proportion of at least 50% by weight of calcium oxide CaO and silicone dioxide $SiO_2$ for improving the stability of a foamed cement slurry when it comes into contact with a material having a water absorption rate of more than 5 g/(m²·s) at 10 minutes according to standard NF EN 772-11 of august 2011.

The invention also concerns a composite insulating mineral construction element obtained by the method according to the invention.

The method of the invention may be used in a discontinuous or continuous system.

The method provided by the present invention has one or more of the following characteristics:
  the method is universal, which is to say it makes it possible to produce a stable mineral foam from any type of cement;
  the method is easy to implement and to use at an industrial scale;
  the method can be easily transported to any site;
  the method makes it possible to implement a mineral foam in a continuous manner. It is therefore possible to produce the mineral foam continuously and to pour this foam without interruption.

The mineral foam provided by the instant invention has one or more of the following characteristics:
  the mineral foam according to the invention has excellent stability properties. In particular, it is possible to obtain foam that does not slump or only very slightly when the foam is poured vertically or from a considerable height. For example, the mineral foam according to the invention did not slump or only very slightly when it is poured vertically from a height greater than or equal to 2 meters;
  the high stability of the mineral foam makes the preparation of lightweight mineral foams possible;
  the mineral foam according to the invention has excellent thermal properties, and in particular very low thermal conductivity. It is highly desirable to reduce thermal conductivity in construction materials since this makes it possible to obtain savings of heating energy for residence and office buildings. Furthermore, this decrease makes it possible to reduce thermal bridges, in particular in the construction of buildings several stories high and designed using indoor thermal insulation. In particular thermal bridges are reduced on the intermediary floors.

BRIEF DESCRIPTION OF THE DRAWINGS

The above and other objects, features and advantages of this invention will be apparent in the following detailed description of an illustrative embodiment thereof, with is to be read in connection with the accompanying drawings wherein.

DETAILED DESCRIPTION

Definitions

Figure 1A:
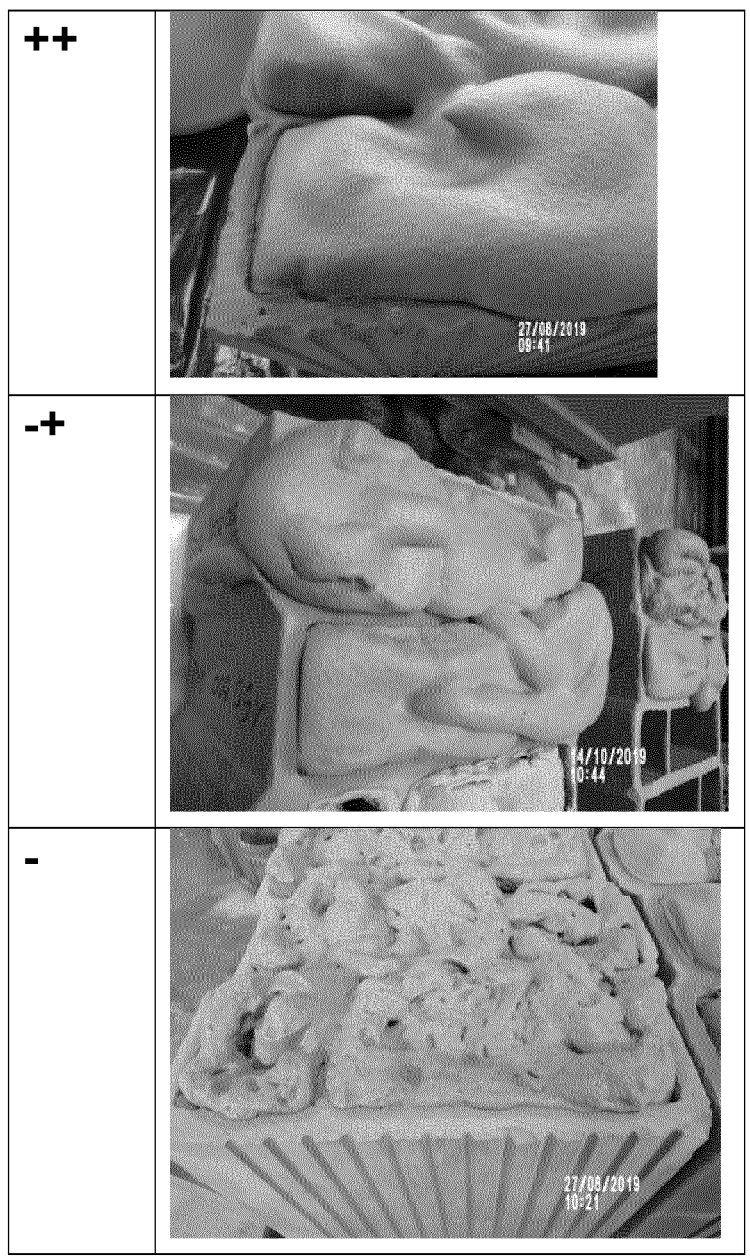
FIG. 1 illustrates the classification of the visual observations when the foamed cement slurry just exits the hose (FIG. 1A), after filling the brick cavities (FIG. 1B) and once the foamed cement slurry has set into mineral foam (FIG. 1C).

Cavity: a hollow portion, a cell, a void, an empty space or excavation on the surface or inside the construction element.

It is a structural void. This cavity has inner walls which will come into contact with the foamed cement slurry.

Construction element: the construction element may be any construction element comprising a cavity, such as a masonry block, in particular a concrete block or a brick, a double wall, a sandwich panel, or a 3D printed construction element. Such construction elements are advantageously made of any porous material, for example a porous material selected from concrete, bricks, agglomerate, asbestos cement, wood, plaster panels, magnesium oxide panels, or combinations thereof.

The construction element is advantageously made of a porous material selected from partially of fully set concrete, partially of fully dried or baked clay, or wood.

Porous material: a porous material is a solid with pores, i.e. cavities, channels or interstices, which are deeper than they are wide and available to an external fluid, i.e. which are active in processes such as fluid flow and fluid absorption. Such material comprises pores commonly termed as "open pores" which may be open only at one end (i.e. blind or dead-end pores) or at two ends (through pores). In some porous materials, the pores may form a continuous channel of communication with one or many external surfaces of the porous material.

Brick: a brick is a rectangular parallelepiped made of clay-type raw material, dried in the sun (i.e. unfired bricks) or baked in an oven (i.e. fired bricks) and used as building material. The clay is often mixed with sand. The brick has one or more cavities. Bricks are advantageously selected from burnt clay bricks, sand lime bricks (calcium silicate bricks), concrete bricks, fly ash clay bricks, firebricks.

Composite: the term "composite" describes the association of a construction element comprising one or more structural voids, in particular blind or through voids, of which one and preferably all are filled with a mineral material having a structure or composition differing from that of said construction. Here the filling mineral material is a mineral foam. The construction element in the composite can be a mineral construction element or a non mineral construction element.

Concrete: the product resulting from hardening of a mixture comprising cement, water, optionally aggregate and/or admixtures conforming with standard EN 934-2 of September 2002, and optional additions. The expression "concrete" designates a composition in the hardened state.

Cement: a cement is a hydraulic binder comprising a proportion of at least 50% by weight of calcium oxide (CaO) and silicon dioxide ($SiO_2$). The cement is preferably a Portland cement as defined in the standard NF-EN-197-1 of April 2012. This standard defines several cement compositions that make use of Portland clinker, and optionally comprise other mineral components such as slag, silica fume, pozzolans (natural and calcined), fly ash (siliceous and calcic) and/or limestone, and calcium sulfate. The cements defined in standard NF-EN197-1 of April 2012 are grouped in 5 different families: CEM I, CEM II, CEM III, CEM IV and CEM V. Cements that belong to the CEM I family contain at least 95 wt.-% of Portland clinker, the other cement families further contain one or several mineral components. Alternatively, the cement can be a CEM I to which one or several additional mineral components are added prior to preparing the cement slurry. The mineral components are defined in paragraph 5.2 of the same standard NF-EN197-1 of April 2012. The cement may optionally further contain less than 10 wt.-% of a calcium aluminate cement or a calcium sulfoaluminate cement if shorter setting times and higher early age strength development are for example required.

Hydraulic binder: material which sets and hardens by hydration. Setting is the changeover from the liquid or paste state to the solid state. Setting is followed or accompanied by a hardening phenomenon whereby the material acquires mechanical properties. Hardening generally occurs on completion of setting, in particular for cement.

Cement slurry: The expression "cement slurry" designates a mixture comprising water and cement. That cement slurry may also comprise additional components, as disclosed below.

Aqueous foam: The expression "aqueous foam" designates a foam produced by combining water and a foaming agent then introducing a gas, generally air.

Foamed cement slurry: The expression "foamed cement slurry" designates a fresh foam comprising water and cement, mixed with gas bubbles, generally air. The foam will also comprise additional components, as disclosed below. The foamed cement slurry generally results from the mixing of a cement slurry and an aqueous foam. The foamed cement slurry is not produced from a gas-forming agent selected from hydrogen peroxide, peroxomonosulphuric acid, peroxodisulfphuric acid, alkaline peroxides, alkaline earth peroxides, organic peroxide, particles of aluminium, or mixtures thereof. The expressions "foamed cement slurry" and "fresh mineral foam" may be used interchangeably.

Mineral foam: a mineral foam is a set (i.e. hardened) foamed cement slurry. The expression "mineral foam" and "mineral cement foam" may be used interchangeably. The mineral foam of the invention is not an expanding foam, meaning is not a foam produced from a gas-forming agent selected from hydrogen peroxide, peroxomonosulphuric acid, peroxodisulfphuric acid, alkaline peroxides, alkaline earth peroxides, organic peroxide, particles of aluminium or mixtures thereof.

Degree of substitution: The degree of substitution of a cellulose ether may be characterized by two different parameters, namely DS (Average Degree of Substitution) and MS (Molar degree of Substitution). The average degree of substitution (DS) is to be understood as the average number of hydroxyl groups substituted per anhydroglucose unit. The value of the DS may vary from 0 to 3. DS may be determined by Nuclear Magnetic Resonance (NMR). The molar degree of substitution (MS) is to be understood as the average number of groups substituted per anhydroglucose unit. The value of the MS may vary from 0 to 1.

The water absorption rate is measured in accordance with standard NF EN 772-11 of August 2011.

Method for Producing a Composite Insulating Mineral Construction Element

In a first aspect, the invention relates to a method for producing a composite insulating mineral construction element comprising the following steps:
  a) filling the cavity of a construction element comprising at least one cavity delimited by at least one inner wall at least partially having a water absorption rate of more than 5 g/($m^2$·s) at 10 minutes with a foamed cement slurry comprising a cement, a metal salt selected from aluminium salt, magnesium salt or iron salt and mixtures thereof, and a cellulose ether;
  b) leaving the foamed cement slurry to set within the cavity;
  wherein the foamed cement slurry comprises from 0.01 to 0.2% by weight of cellulose ether, relative to the weight of cement.

Step b) results in the formation of a mineral foam

Once the foamed cement slurry has set, a composite insulating mineral construction element whose cavity is filled with mineral foam is obtained.

Construction Element

At least one portion of the inner walls of the construction element have the capacity to absorb water with a water absorption rate of more than 5 g/(m$^2$·s) at 10 minutes when some water is dispersed on it for example by immersion, sprinkling or vaporization.

The inner wall partially preferentially have at least 50% of its surface area, advantageously 75% of its surface area, more advantageously at least 90% of its surface area, even more advantageously 99% of its surface area presenting a water absorption rate of more than 5 g/(m$^2$·s) at 10 minutes.

The water absorption rate may be advantageously of more than 6 g/(m$^2$·s) at 10 minutes, more advantageously of more than 7 g/(m$^2$·s) at 10 minutes.

The surface of this portion of the inner wall is advantageously porous, i.e. made of a porous material.

The surface of this portion of the inner wall is advantageously dry or substantially dry.

Advantageously, the inner wall is not covered with a water repellent substance.

In an embodiment, the construction element is made of a porous material selected from partially of fully set concrete, partially of fully dried or baked clay, or wood.

In an embodiment, the construction element is a mineral construction element.

Cellulose Ether

The foamed cement slurry advantageously comprises from 0.01% to 0.2% of cellulose ether, advantageously 0.01% to 0.1% of cellulose ether, relative to the weight of cement. Accordingly, the foamed cement slurry advantageously comprises from 0.01% to 0.2% of cellulose ether, advantageously 0.01% to 0.1% of cellulose ether, relative to the weight of cement.

The cellulose ether can be an anionic cellulose ether such as carboxymethyl cellulose (CMC), carboxymethyl hydroxyethyl cellulose (CMHEC), carboxymethyl hydroxypropyl cellulose (CMHPC), sulfoethyl methyl hydroxyethyl cellulose (SEMHEC), sulfoethyl methyl hydroxypropyl cellulose (SEMHPC) or a nonionic cellulose ether such as hydroxyethyl cellulose (HEC), hydroxypropyl cellulose (HPC), methyl cellulose (MC), methyl hydroxypropyl cellulose (MHPC), methyl hydroxyethyl cellulose (MHEC), ethyl hydroxyethyl cellulose (EHEC) or methyl ethyl hydroxyethyl cellulose (MEHEC) or a mixture thereof.

Advantageously, the cellulose ether is a nonionic cellulose ether or a mixture thereof. Methyl hydroxyethyl cellulose, a methyl hydroxypropyl cellulose, a methyl hydroxybutyl cellulose or mixtures thereof are preferred.

The average degree of polymerization DP of the cellulose ether is advantageously comprised from 100 to 4000. The DP may be determined from cellulose ether intrinsic viscosity measured according to ASTM D 1795 of January 2013.

The average degree of substitution DS of the cellulose ether is advantageously comprised from 1 to 2.5.

The cellulose ether advantageously has a viscosity level comprised between 100 mPa·s to 5000 mPa·s, advantageously a viscosity ranging between 300 mPa·s to 1500 mPa·s. The cellulose ether viscosity level may be measured with an Hoeppler falling ball viscometer according to DIN 53015 (2001) or alternatively using a Brookfield rotation viscometer with a 2% solution of the cellulose ether product having 5% moisture content, at 20° C., 20° dH (German hardness).

Advantageously, the cellulose ether is a cellulose ether with delayed solubility. As used herein, "delayed solubility" describes cellulose ethers which have been modified so as to exhibit delayed dissolution in water. Cellulose ethers with delayed solubility include but are not limited to, those described in U.S. Patent Application Pub. No. 2016/0215069 A1 (SE Tylose GmbH & Co KG) and EP Patent. 1 316 563 (Wolff Cellulosics GmbH & Co KF) which are hereby incorporated by reference.

The above U.S. Patent Application Pub. No. 2016/0215069 A1 disclose a reversibly crosslinked, water-soluble cellulose ether having at least two different ether components, wherein a) at least one of the ether components is an alkyl, hydroxyalkyl or carboxymethyl group and b) at least one of the ether components is an alkyl group having an aldehyde function which can form hydrolysable hemiacetals with free hydroxy groups of the cellulose ether, wherein the ether component b) is a 2-oxo-ethyl group and the degree of substitution DS (2-oxo-ethyl) is in the range of from 0.0001 to 0.1. The ether component a) is preferably a methyl, ethyl, propyl, butyl, sec-butyl, isobutyl, 2-hydroxyethyl, hydroxypropyl and/or carboxymethyl group. The degree of substitution DS(alkyl) is advantageously in the range from 1.2 to 2.2, preferably in the range from 1.4 to 2.0. The degree of substitution MS(hydroxyalkyl) is advantageously in the range from 1.0 to 4.0, preferably in the range from 1.5 to 3.5. The degree of substitution DS(carboxymethyl) is advantageously in the range from 0.2 to 1.2, preferably in the range from 0.4 to 1.0.

The above EP Patent. No. 1 316 563 disclose a cellulose ether which displays delayed dissolution in water prepared according to a process comprising the steps a) treatment of the moist cellulose ether with a solution of a dialdehyde and b) drying and comminution of the cellulose ether, wherein an aqueous salt solution which is a solution of at least two salts and one of the salts is a weak acid having a pKa of from 5.5 to 8.5 and the other salt is the salt of this weak acid having the pKa of from 5.5 to 8.5, is added simultaneously or together with the solution of the dialdehyde to the cellulose ether so as to set the pH of the cellulose ether homogeneously to from 6.0 to 8.0. The cellulose ether is preferably a nonionic cellulose ether from the group consisting of methylcellulose, methylhydroxyethylcellulose, methylhydroxypropylcellulose and hydroxyethylcellulose or an ionic cellulose ether from the group consisting of carboxymethylcellulose, carboxymethylhydrwryethylcellulose, sulphoethylcellulose and carboxymethylsulphoethylcellulose. Glyoxal is preferably used as dialdehyde in an amount of from 0.1 to 4% by weight, based on the dry cellulose ether.

The above cellulose ethers with delayed solubility are merely illustrative. One of ordinary skill in the art will be familiar with other cellulose ethers with delayed solubility.

Metal Salt

The foamed cement slurry comprises a metal salt selected from aluminium, magnesium or iron salt and mixtures thereof is added to the foamed cement slurry.

The metal salt is advantageously a metal sulphate.

An aqueous composition comprising the metal salt is advantageously used.

An aluminium salt is preferred. Preferably, the aluminium salt is aluminium sulphate ($Al_2(SO_4)_3$).

The foamed cement slurry advantageously comprises from 0.15% to 5% by weight, advantageously 0.15% to 3% by weight, more advantageously 0.15% to 1% by weight of metal salt, relative to the weight of cement. Accordingly, the foamed cement slurry advantageously comprises 0.15% to 5% by weight, advantageously 0.15% to 3% by weight, more advantageously 0.15% to 1.5% by weight of metal salt, relative to the weight of cement.

Cement

As mentioned above, the cement advantageously comprises a Portland cement as defined in the standard NF-EN-197-1 of April 2012.

Portland cement as used in the invention may be any type of Portland cement, whatever its chemical composition is, and in particular whatever its alkaline content is.

Therefore, one of the advantages of the invention is not having to select a specific type of Portland cement. Advantageously, the Portland cement used in the invention is selected from the cements readily available on the market.

Advantageously the cement comprises at least 90 wt.-% of Portland clinker.

Advantageously, the cement has a specific surface (Blaine) of from 3000 to 10000 cm$^2$/g, preferably from 3500 to 6000 cm$^2$/g.

As mentioned above, the cement may comprise mineral components such as slag, silica fume, pozzolans (natural and calcined), fly ash (siliceous and calcic) and/or limestone, and calcium sulfate as defined in paragraph 5.2 of the standard NF-EN197-1 of April 2012.

The mineral component is advantageously composed of particles that have a D50 generally comprised between 0.1 to 150 µm, preferably from 0.1 to 100 µm, more preferably from 1 µm and 20 µm.

In particular, the mineral component comprises less than 1 wt.-% of ultrafine mineral particles with a D50 less than or equal to 1 µm, more particularly less than 0.5 wt.-%, the percentages being expressed by mass relative to the mass of the mineral component.

Preferably, the mineral component does not comprise ultrafine mineral particles with a D50 less than or equal to 1 µm.

The D50, also noted as Dv50, corresponds to the 50$^{th}$ percentile of the size distribution of the particles, by volume; that is, 50% of the particles have a size that is less than or equal to D50 and 50% of the particles have a size that is greater than D50.

Cements that are less or not suitable for the realization of the invention are calcium aluminate cements and their mixtures used alone. Calcium aluminate cements are cements generally comprising a mineral phase C4A3$, CA, C12A7, C3A or C11A7CaF$_2$ or their mixtures, such as, e.g., Ciment Fondue (a calcium aluminate-based hydraulic binder), alumina cements, sulfoaluminate cements and calcium aluminate cements according to the European NF EN 14647 Standard of December 2006. Such cements are characterized by an alumina (Al$_2$O$_3$) content equal or lower than 35 wt.-%. However, calcium aluminate cements, calcium sulfoaluminate cements, or mixtures thereof, may be used in small amounts if for example shorter setting times or increased early age strength is desired. Calcium aluminate cements, calcium sulfoaluminate cements, or mixtures thereof, may not exceed 10 wt.-% of the total cement.

Accordingly, preferably, the cement of the invention has an alumina (Al$_2$O$_3$) content lower or equal to 35 wt.-%.

Foaming Agent

The foamed cement slurry may also comprise a foaming agent.

A foaming agent is generally a compound which modifies the superficial tension between two surfaces, in particular which lowers the superficial tension at the interface between a liquid and a gas, between a liquid and a solid or between two liquids. This compound is also called a surfactant.

The foaming agent used according to the invention may be selected from ionic, non-ionic, amphiphilic, amphoteric foaming agents and mixtures thereof.

The ionic surfactants may advantageously be selected from alkylethersulfonates, hydroxyalkylethersulfonates, alphaolefinesulfonates, alkylbenzenesulfonates, alkylester sulfonates, alkylethersulfates, hydroxyalkylethersulfates, alphaolefinesulfates, alkylbenzenesulfates, alkylamide sulfates, as well as their alkoxylated derivatives (in particular ethoxylated derivatives (EO) and/or propoxylated derivatives (PO)), fatty acid salts and/or their alkoxylated derivatives, in particular (EO) and/or (PO) (for example lauric acid, palmitic acid or stearic acid), alkylglycerol sulfonates, sulfonated polycarboxylic acids, paraffin sulfonates, N-akyl N-alkyltaurates, alkylphosphates, alkylsuccinamates, alkylsulfosuccinates, monoesters or diesters of sulfosuccinates, sulfates of alkylglucosides, for example those in acid or lactone form and derivatives of I 17-hydroxyoctadecenic acid, or mixtures thereof.

The non-ionic surfactants may advantageously be selected from ethoxylated fatty acids, alkoxylated alkylphenols (in particular (EO) and/or (PO)), aliphatic alcohols, more particularly in C8-C22, products resulting from the condensation of ethylene oxide or propylene oxide with propylene glycol or ethylene glycol, products resulting from the condensation of ethylene oxide or propylene oxide with ethylene diamine, amides of alkoxylated fatty acids (in particular (EO) and/or (PO)), alkoxylated amines (in particular (EO) and/or (PO)), alkoxylated amidoamines (in particular (EO) and/or (PO)), amine oxides, alkoxylated terpenic hydrocarbons (in particular (EO) and/or (PO)), alkylpolyglucosides, polymers or amphiphilic oligomers, ethoxylated alcohols, esters of sorbitan or esters of oxyethylated sorbitan, or mixtures thereof.

The amphoteric surfactants may advantageously be selected from betaines, derivatives of imidazoline, polypeptides, lipoaminoacides or mixtures thereof. More particularly, suitable betaines according to the invention may be selected from cocamidopropyl betaine, dodecylic betaine, hexadecylic betaine and octadecylic betaine.

Amphiphilic surfactants may also be selected from polymers, oligomers or copolymers which are at least miscible in the aqueous phase. The amphiphilic polymers or oligomers may have a statistic distribution or a multi-block distribution. The amphiphilic polymers or oligomers may advantageously be selected from block polymers comprising at least one hydrophilic block and at least one hydrophobic block, the hydrophilic block being obtained from at least one non-ionic and/or anionic monomer. Amphiphilic polymers or oligomers may advantageously be selected from polysaccharides having hydrophobic groups, in particular alkyl groups, polyethylene glycol and its derivatives.

By way of example, the following amphiphilic polymers or oligomers may also be mentioned: three-block polyhydroxystearate polymers-polyethylene glycol-polyhydroxystearate or hydrophobic polyacrylamides.

Non-ionic amphiphilic polymers, and more particularly alkoxylated polymers (in particular (EO) and/or (PO)), are more preferably selected from polymers of which at least one part (at least 50% by weight) is miscible in water. Three-block polyethylene glycol/polypropylene glycol/polyethylene glycol polymer are preferred.

The foaming agent may also be a protein (such as keratin) or an organic protein derivative of animal origin (such as, e.g., the foaming agent named Propump26, a liquid mixture of hydrolysed keratin, sold by the company Propump Engineering Ltd) or of vegetable origin.

The foaming agents may also be a cationic surfactant (for example cetyltrimethylammonium bromide, CTAB), an ionic surfactant, an amphoteric surfactant (for example cocamidopropyl betaine, CAPB), or a nonionic surfactant, or mixtures thereof.

Preferably, the foaming agent used according to the invention is a protein with a molecular weight of 1000 to 50 000 Daltons.

Preferably, the foaming agent is used according to the invention at a concentration of 0.15 to 1%, more preferably from 0.20 to 0.85%, by mass of foaming agent relative to the mass of foamed cement slurry. Even more preferably, the foamed cement slurry comprises at least 0.1% of foaming agent relative to the mass of foamed cement slurry. Most preferably, the foamed cement slurry comprises at least 0.3% of foaming agent relative to the mass of foamed cement slurry.

Water-Reducer

The foamed cement slurry may also comprise a water reducer.

A water reducer or plasticizer makes it possible to reduce the amount of mixing water for a given workability by typically 10-15%. By way of example of water reducers, mention may be made of lignosulphonates, hydroxycarboxylic acids, carbohydrates, and other specific organic compounds, for example glycerol, polyvinyl alcohol, sodium alumino-methyl-siliconate, sulfanilic acid and casein as described in the Concrete Admixtures Handbook, Properties Science and Technology, V.S. Ramachandran, Noyes Publications, 1984.

Super-plasticisers belong to a new class of water reducers and are capable of reducing water contents of mixing water, for a given workability, by approximately 30% by mass. By way of example of a super-plasticiser, the PCP super-plasticisers without an anti-foaming agent may be noted. The term "PCP" or "polyoxy polycarboxylate" is to be understood according to the present invention as a copolymer of acrylic acids or methacrylic acids and their esters of polyoxy ethylene (POE).

Preferably, the foamed cement slurry may comprise from 0 to 1%, more preferably 0 to 0.5%, for example from 0.05% to 1% or 0.05% to 0.5%, of a water reducer, a plasticiser or a super-plasticiser, percentage expressed by mass relative to the dry cement mass.

Preferably, the foamed cement slurry does not comprise an anti-foaming agent, or any agent having the property of destabilizing an air/liquid emulsion. Certain commercial super-plasticisers may contain anti-foaming agents and consequently these super-plasticisers are not suitable for the cement slurry used to produce the mineral foam according to the invention.

Co-Stabilizer

The foamed cement slurry may also comprise a co-stabilizer.

The co-stabiliser according to the invention is not a water-reducer or a high water-reducer, and thus is not a plasticiser or a superplasticizer.

In the context of the present invention, a "water-reducer" or a "plasticizer" is an agent which, in accordance with standard ADJUVANT NF EN 934-2 (September 2002), allows a water reduction for admixed concrete ≥5% relative to control concrete. A "high water-reducing agent" or "superplasticizer" is an admixture which allows a water reduction for admixed concrete 12% relative to control concrete.

The co-stabiliser according to the invention does not correspond to these characteristics.

The co-stabiliser is preferably a polyelectrolyte, in particular a polyanion.

The co-stabiliser is preferentially a polymer having constitutional unit derived from unsaturated carboxylic acid monomer or anhydride thereof. The carboxylic acid monomer can be monocarboxylic acid monomer or dicarboxylic acid monomer.

Examples thereof include:
  acrylic acid, methacrylic acid; crotonic acid, maleic acid, fumaric acid, itaconic acid, and citraconic acid, and their monovalent metal salts, divalent metal salts, ammonium salts, and organic amine salts, and anhydride thereof;
  esters, half esters and diesters of the above-mentioned unsaturated carboxylic acid monomers with alcohols having 1 to 12 carbon atoms, with alkoxy (poly)alkylene glycols, in particular with alkoxy (poly)ethylene glycol or with alkoxy (poly)propylene glycol;
  amides, half amides and diamides of the above-mentioned unsaturated carboxylic acid monomers with amines having 1 to 30 carbon atoms, such as methyl(meth)acrylamide, (meth)acrylalkylamide, N-methylol(meth)acrylamide, and N,N-dimethyl(meth)acrylamide;
  alkanediol of the above-mentioned unsaturated carboxylic acid monomers such as 1,4-butanediol mono(meth)acrylate, 1,5-pentanediol mono(meth)acrylate, and 1,6-hexanediol mono(meth)acrylate;
  amines of the above-mentioned unsaturated carboxylic acid monomers such as aminoethyl (meth)acrylate, methylaminoethyl (meth)acrylate, dimethylaminoethyl (meth)acrylate, dimethylaminopropyl (meth)acrylate, and dibutylaminoethyl (meth)acrylate.

These monomers may be used either alone respectively or in combinations of two or more thereof. The monomer is in particular selected from acrylic acid, methacrylic acid, crotonic acid, maleic acid, fumaric acid, itaconic acid, and citraconic acid and anhydride thereof, in particular maleic anhydride, and mixtures thereof.

These monomers can also be copolymerised with hydrophobic monomers, in particular with:
  vinyl aromatic monomers such as styrene, alpha-methylstyrene, vinyltoluene, and p-methylstyrene;
  dienes such as butadiene, isoprene, 2-methyl-1,3-butadiene, and 2-chloro-1,3-butadiene;
  1-alkenyl monomers having 2 to 12 carbon atoms, such as di-isobutylene.

The co-stabiliser is preferentially a copolymer of the above-mentioned unsaturated carboxylic acid monomers, or anhydride thereof, and of 1-alkenyl monomers having 2 to 12 carbon atoms, such as di-isobutylene. In particular the co-stabiliser is a copolymer of maleic anhydride and di-isobutylene.

The acid carboxylic function of the polymer is preferably totally or partially in a salt form. Advantageously the salt is a cation chosen from among the sodium, potassium, calcium, magnesium, ammonium, or their blends, preferentially chosen from among sodium or potassium and very preferentially sodium.

In a preferred embodiment, the co-stabiliser is a sodium salt of a maleic anhydride copolymer, in particular a sodium salt of a maleic anhydride and di-isobutylene copolymer.

A commercial product commercialised by Dow, TAMOL 731 A, was found to be suitable for this invention.

Setting Accelerator

The slurry of foamed cement may comprise a setting accelerator. Suitable accelerators may for example be selected from:

- calcium salts, potassium salts and sodium salts wherein the anion may be nitrate, nitrite, chloride, formiate, thiocyanate, sulphate, bromide, carbonate or mixtures thereof;
- alkali silicates and aluminates, for example sodium silicate, potassium silicate, sodium aluminate, potassium aluminate or mixtures thereof.

Preferably, the slurry of foamed cement used to produce the mineral foam according to the invention comprises 0.05 to 0.8% of an accelerator, in % by mass relative to the mass of foamed cement slurry.

Setting Retarder

The slurry of foamed cement may comprise a setting retarder. The retarder advantageously corresponds to the definition of the retarder mentioned in the European NF EN 934-2 Standard of September 2002. The retarder used according to the invention may for example be selected from:

- sugars and derivative products, in particular, saccharose, glucose, sugar reducers (for example, lactose or maltose), cellobiose, gallactose or derivative products, for example, glucolactone;
- carboxylic acids or salts thereof, in particular gluconic acid, gluconate, tartric acid, citric acid, gallic acid, glucoheptonic acid, saccharic acid or salicylic acid. The associated salts comprise, for example, ammonium salt, alkali metal salt (for example sodium salt or potassium salt), alkali earth metal salt (for example calcium salt or magnesium salt).
- However, other salts may also be used;
- phosphonic acids and salts thereof, in particular aminotri(methylenephosphonic) acid, pentasodic salt of aminotri(methylenephosphonic) acid, hexamethylene-diamine-tetra(methylene-phosphonic) acid, diethylene-triamine-penta(methylene-phosphonic acid and its sodium salt);
- phosphates and their derivatives;
- zinc salts, in particular zinc oxide, zinc borate and soluble zinc salts (nitrate, chloride);
- borates, in particular boric acid, zinc borate and boron salts;
- mixtures of these compounds.

The retarder may also be a carboxylic acid or a salt of carboxylic acid. According to an embodiment of the invention, the retarder is a citric acid or a salt thereof.

The slurry of foamed cement advantageously comprises 0.005 to 0.2% of retarder, more preferably 0.01 to 0.1%, in % by mass relative to the mass of slurry of foamed cement.

Other Additives

The foamed cement slurry may comprise other additives. Such additives may be thickening agents, viscosity modifying agents, water retention agents, air entraining agents, setting retarders, setting accelerators, coloured pigments, hollow glass beads, film forming agents, mineral additions or their mixtures. Preferably, the additives do not comprise any defoaming agents.

Suitable water retention agents are preferably gums, starch or its derivatives, gelatine, agar, carrageenan or bentonite clays.

Method for Preparing the Foamed Cement Slurry Used in Step a)

The foamed cement slurry used in step a) may be obtained by a process comprising:

(i) separately preparing a cement slurry comprising cement and an aqueous foam;
(ii) contacting the cement slurry with the aqueous foam to obtain a foamed cement slurry;
wherein:
the cement slurry of step (i) comprises the metal salt, and
the cellulose ether is comprised within the cement slurry of step (i) and/or is within the aqueous foam of step (i) and/or is added to the foamed cement slurry obtained in step (ii)

Advantageously, the foamed cement slurry used in step a) is obtained by a process comprising:

(i) separately preparing a cement slurry and an aqueous foam;
(ii) contacting the cement slurry with the aqueous foam to obtain a foamed cement slurry;
(iii) adding either simultaneously, separately or sequentially the metal salt and cellulose ether to the cement slurry or to the aqueous foam obtained in step (i) or to the foamed cement slurry obtained in step (ii) wherein:
the metal salt is added to the foamed cement slurry obtained in step (ii), and
the cellulose ether is added to the cement slurry provided in step (i), to the aqueous foam provided in step (i) and/or to the foamed cement slurry obtained in step (ii).

Step (i): Cement Slurry

The cement slurry used in step (i) is typically a mixture comprising cement, and water, and that may include one or several chemical admixtures to adjust its rheological properties (such as a superplasticizer or a thickener) and to accelerate or retard the setting time of the cement.

The water/cement ratio of the cement slurry used in step (i) is preferably from 0.25 to 0.5, more preferably from 0.28 to 0.45, even more preferably from 0.29 to 0.45.

The water/cement ratio may be modulated depending on the density of the mineral foam to be obtained. Advantageously, a cement slurry having a water/cement ratio from 0.29 and 0.34 is used to obtain low-density mineral foams, typically from 40 to 150 kg/m$^3$. To obtain a mineral foam having a higher density, typically from 300 to 400 kg/m$^3$, a cement slurry having a water/cement ratio from 0.34 to 0.5, preferably from 0.34 to 0.45 is advantageously used.

The cement slurry prepared in step (i) may further comprise a water reducer, such as a plasticiser or a super-plasticiser, as disclosed above.

Preferably, the cement slurry comprises 0.05 to 1%, more preferably 0.05 to 0.5% of a water reducer, a plasticiser or a super-plasticiser, percentage expressed by mass relative to the dry cement mass.

According to an embodiment of the invention, the cement slurry used to produce the mineral foam according to the invention may further comprise a mineral component, as disclosed above. Preferably, the cement slurry used to produce the mineral foam according to the invention may comprise 5 to 50% of a mineral component, the percentages being expressed by weight relative to the weight of cement.

In step (i), the cement slurry may be prepared using mixers typically used to produce cement slurries. They may be a mixer for slurries, a mixer from a cement batching plant, a mixer described in the European NF EN 196-1 Standard of April 2006—Paragraph 4.4, or a beater with a planetary movement.

According to a first mode of operation, the cement slurry may be prepared by introducing into a mixer water and optionally additives (such as a water reducer). Thereafter, the cement, and optionally other pulverulent components, are added into the mixer. The paste that is obtained in this way is then mixed for obtaining the cement slurry. Preferably, the cement slurry is kept under agitation for example by means of a deflocculating paddle at a speed which may be between 1000 and 600 rpm, depending on the volume of the slurry, during the entire manufacturing process.

According to a second mode of operation, the cement slurry may be prepared by introducing a part of the water and optionally the additives (such as a water reducer) in a mixer, and then the cement and afterwards the further components.

According to a third mode of operation, the cement slurry may be prepared by introducing into a mixer the cement, and eventually all the others pulverulent components. The cement and the pulverulent components are mixed in order to obtain a homogenous mixture. Water and optionally the additives (such as a water reducer) are then introduced into the mixer.

According to a fourth mode of operation, the cement slurry is prepared in a continuous way by preparing in advance a mixture containing water and additives (such as a water reducer).

Step (i): Aqueous Foam

In step (i), the aqueous foam may be produced by combining water and a foaming agent, then introducing a gas. This gas is preferably air. The foaming agent is preferably used in an amount of 0.25-5.00 wt.-%, preferably 0.4 to 2.0 wt.-%., even more preferably 0.4-1.00 wt.-% (dry mass) of the mass of water.

The introduction of air may be carried out by stirring, by bubbling or by injection under pressure. Preferably, the aqueous foam may be produced using a turbulent foamer (bed of glass beads for example). This type of foamer makes it possible to introduce air under pressure into an aqueous solution comprising a foaming agent.

The aqueous foam may be generated continuously in the process according to the invention.

The generated aqueous foam has air bubbles with a D50, which is less than or equal to 400 µm, preferably comprised from 100 to 400 µm, more preferably comprised from 150 to 300 µm. Preferably, the generated aqueous foam has air bubbles with a D50 which is 250 µm.

The D50 of the bubbles is measured by back scattering. The apparatus used is the Turbiscan® Online provided by the Formulaction company. Measurements of the back scattering make it possible to estimate a D50 for the bubbles of an aqueous foam, by knowing beforehand the volume fraction of the bubbles and the refractive index of the solution of foaming agent.

The foaming agent is as disclosed above.

The aqueous foam may also comprise a co-stabiliser, as disclosed above.

Step (ii): Contacting the Cement Slurry and the Aqueous Foam

In step (ii), the cement slurry may be homogenized with the aqueous foam by any means to obtain a slurry of foamed cement. Preferably, step (ii) of the process according to the invention may comprise the introduction of the cement slurry and the aqueous foam into a static mixer to obtain a slurry of foamed cement.

The suitable static mixers preferably have elements in the form of a propeller to ensure complete radial mixing and successive divisions of the flow for each combination of liquids and gas. The suitable static mixers according to the invention preferably have helical elements which transmit a radial speed to the fluid, which is directed alternatively towards the side of the mixer, then towards its centre. The successive combinations of elements directing the flow clockwise and counter clockwise provoke a change of direction and a division of the flow. These two combined actions increase the efficiency of the mixing. Preferably, the static mixer used in the process according to the invention is a mixer operating by dividing the continuous flow of cement slurry and of aqueous foam. The homogeneity of the mix is based on the number of divisions. According to the process of the invention, 16 elements are preferably used to ensure good homogeneity. The suitable static mixers according to the process of the invention are preferably those commercialised under the brand name of Kenics®.

According to a more particular embodiment, the cement slurry is pumped at a precise volume flow, which is a function of the composition of foamed cement slurry to be obtained. Then, this cement slurry is combined with the aqueous foam already circulating in the circuit of the process. The slurry of foamed cement according to the invention is thus generated. This slurry of foamed cement is cast and left to set.

Advantageously, the inventive process does not need neither an autoclave step, nor a thermal treatment step (for example at 60-80° C.) in order to obtain a mineral foam according to the invention.

Step (iii): Adding a Metal Salt and Cellulose Ether

As mentioned above, the metal salt and the cellulose ether can be added either simultaneously, separately or sequentially to the cement slurry or to the aqueous foam provided in step (i) or to the foamed cement slurry obtained in step (ii), wherein:

the metal salt is added to the foamed cement slurry obtained in step (ii), and the cellulose ether is added to the cement slurry provided in step (i), to the aqueous foam provided in step (i) and/or to the foamed cement slurry obtained in step (ii).

Indeed, preferably metal salt is not added to the cement slurry as it may cause its immediate setting and hardening, nor is into the aqueous foam as it may provoke a reaction which hardens the aqueous foam.

In contrast, the cellulose ether can be added to the cement slurry, to the aqueous foam; and/or to the foamed cement slurry. The total amount of cellulose ether can be split among the alternative options. However, the inventors found that the amounts of the cellulose ether that it is possible to add in the cement slurry and the aqueous foam is limited. On one hand, adding cellulose ether added in the cement slurry render it viscous and above a certain threshold makes it difficult to pump and mix it with the aqueous foam. On the other hand, the cellulose ether may not be introduced in the mineral form in powder form and should thus be dissolved in water prior injection into aqueous foam, which results in diluting the foamed cement slurry when too much cellulose ether is added in the aqueous foam.

The inventors have found that adding simultaneously the metal salt and the cellulose ether in the foamed cement slurry obtained in step (ii) under the form of a dispersion of cellulose ether in an aqueous solution of a metal salt (e.g. aluminium sulphate) overcome the above-mentioned difficulties.

In an embodiment, the method for producing the foamed cement slurry of step a) comprises a step (iii) of adding a mixture comprising a metal salt, cellulose ether and water in the foamed cement slurry obtained in step (ii). For example, the mixture can be injected within one or many of the static mixer(s) disclosed above.

In a preferred embodiment, this mixture comprises a sufficient amount of metal salt so that the cellulose ether remains in the form of particles dispersed in the aqueous solution of metal salt. In other terms, the mixture is a dispersion of cellulose ether in an aqueous solution of metal salt.

In that embodiment, when the mixture is added to the foamed cement slurry, the water contained in the foamed cement slurry will dilutes the metal salt. As a result, the cellulose ether becomes soluble and once solubilized, it increases the viscosity of the foam cement slurry, and thus plays a role of water retention. This allows cellulose ether particles to be injected into the foamed cement slurry. The cellulose particles are suspended in the mixture and do not give viscosity to the mixture thanks to an appropriate concentration of metal salt.

Advantageously, the mixture comprises an amount of metal salt such that the weight of metal salt is at least of 20 wt.-%, advantageously from 20 to 50 wt.-%, more advantageously from 20 to 40 wt.-%, relative to the weight of the mixture.

Advantageously, the mixture comprises an amount of metal salt and an amount of cellulose ether adjusted to respect both a weight ratio metal salt/cement and a weight ratio cellulose ether/cement to be obtained in the foamed cement slurry.

The weight ratio metal salt/cement in the foamed cement slurry to be obtained is advantageously comprised between 0.01 and 0.5 wt.-%, more advantageously between 0.01 and 0.1 wt.-%, even more advantageously between 0.01 and 0.08 wt.-%.

In this embodiment, the content of metal salt, the content of cellulose ether and the water content in the mixture are thus advantageously adjusted depending on the percentage by weight of cellulose ether and of metal salt, relative to the weight of cement, to be obtained in the foamed cement slurry. As mentioned above, the metal salt is preferably a salt of aluminium, more preferably is aluminium sulphate.

For example, starting from an aqueous solution comprising 28 wt.-% metal salt, and if the target concentrations in the desired foamed cement slurry are a weight ratio metal salt/cement ratio of 0.5% and a weight ratio cellulose ether/cement of 0.03%, a dispersion comprising 0.03×28/0.5=1.68 wt.-% of cellulose ether is to be prepared.

Advantageously, the mixture comprises cellulose ether in the form of particles having an average particle size of 125 μm or less. Such a low particle size avoids, limit or slow down the decantation of ether cellulose in metal salt solution.

Step b): Setting of the Foamed Cement Slurry Resulting in the Formation of a Mineral Foam The mineral foam obtained after step b) according to the method of the invention has one or many of the following features:

The mineral foam has a density of less than 600 kg/m$^3$, preferably a density ranging from 35 to 500 kg/m$^3$;

The mineral foam comprises from 0.01% to 0.2% by weight of cellulose ether, advantageously 0.01% to 0.1% by weight of cellulose ether, relative to the weight of cement;

The mineral foam comprises 0.05 to 5% by weight, advantageously 0.15% to 5% by, advantageously 0.15% to 3% by weight, more advantageously 0.15 to 1.5% by weight of metal salt, preferably of aluminium sulphate, relative to the weight of cement.

The range of densities mentioned above is of particular interest for the present invention as it was found to be a good compromise between density, therefore thermal resistivity, and strength. To achieve this desired density, the weight ratio between the cement slurry and the aqueous foam may be adjusted accordingly.

The dry mineral cement foam preferably has thermal conductivity ranging from 0.033 to 0.1 W/m·K, preferably from 0.037 to 0.065 W/m·K and more preferably from 0.038 to 0.060 W/m·K.

Thermal conductivity (also known as lambda (λ)) is a physical magnitude characterizing the behavior of materials at the time of heat transfer via conduction. Thermal conductivity represents the amount of heat transferred per unit surface area and per unit of time under a temperature gradient. In the international unit system, thermal conductivity is expressed in watts per meter Kelvin ($W·m^{-1}·K^{-1}$).

Use

The invention is also directed to the use of a combination of a metal salt as defined above and of cellulose ether as defined above for improving the stability of a foamed cement slurry when it comes into contact with a material having a water absorption rate of more than 5 g/(m$^2$·s) at 10 minutes.

The metal salt, the cellulose ether and the formed cement slurry are as detailed above.

The material is in particular a porous water-absorbent material as mentioned above. The material is in particular a mineral material or wood.

The term combination herein refers to the simultaneous, separate or sequential addition of the metal salt(s) and the cellulose ether in the process according to the method of the invention.

In a preferred embodiment, the metal salt and the cellulose ether are added simultaneously under the form of a mixture comprising the metal salt and the cellulose ether.

In another embodiment, the metal salt and the cellulose ether may be added separately according to the method of the invention under the form of two different mixtures, one mixture comprising the metal salt and the other one comprising the cellulose ether.

Separate additions are carried out at the same time or within time frames that overlap.

In another embodiment, the metal salt and the cellulose ether may be added sequentially according to the method of the invention under the form of two different mixtures, one mixture comprising the metal salt and the other one comprising the cellulose ether.

Sequential additions are carried out the one after the other, i.e. in different time frames. In other terms, the mixture comprising the metal salt is added after the mixture comprising the cellulose ether, or vice versa.

The mixtures recited above are preferably aqueous mixtures.

Composite Insulating Mineral Construction Element

The invention also concerns a composite insulating mineral construction element obtained by the method according to the invention.

The composite insulating mineral construction element comprises a construction element comprising a cavity filled with a mineral foam as detailed above.

For example, the composite insulating mineral construction element may be selected from composite insulating masonry block, in particular a composite insulating concrete block or brick, a composite insulating double wall, a composite insulating sandwich panel, or a composite insulating 3D printed construction element.

Measurements

The measuring methods used are now detailed below.

Laser Granulometry Method

In this specification, including the accompanying claims, particle size distributions and particle sizes are as measured using a laser granulometer of the type Mastersize 2000 (year 2008, series MAL1020429) sold by the company Malvern.

Measurement is carried out in an appropriate medium (for example an aqueous medium for non-reactive particles, or alcohol for reactive material) in order to disperse the particles. The particle size shall be in the range of 1 µm to 2 mm. The light source consists of a red He—Ne laser (632 nm) and a blue diode (466 nm). The optical model is that of Frauenhofer and the calculation matrix is of the polydisperse type. A background noise measurement is effected with a pump speed of 2000 rpm, a stirrer speed of 800 rpm and a noise measurement for 10 s, in absence of ultrasound. It is verified that the luminous intensity of the laser is at least equal to 80% and that a decreasing exponential curve is obtained for the background noise. If this is not the case, the cell's lenses have to be cleaned.

Subsequently, a first measurement is performed on the sample with the following parameters: pump speed 2000 rpm and stirrer speed 800 rpm. The sample is introduced in order to establish an obscuration between 10 and 20%. After stabilisation of the obscuration, the measurement is effected with a duration between the immersion and the measurement being fixed to 10 s. The duration of the measurement is 30 s (30000 analysed diffraction images). In the obtained granulogram one has to take into account that a portion of the powder may be agglomerated.

Subsequently, a second measurement is effected (without emptying the receptacle) with ultrasound. The pump speed is set to 2500 rpm, the stirrer speed is set to 1000 rpm, the ultrasound is emitted at 100% (30 watts). This setting is maintained for 3 minutes, afterwards the initial settings are resumed: pump speed at 2000 rpm, stirrer speed at 800 rpm, no ultrasound. At the end of 10 s (for possible air bubbles to clear), a measurement is carried out for 30 s (30000 analysed images). This second measurement corresponds to a powder desagglomerated by an ultrasonic dispersion.

Each measurement is repeated at least twice to verify the stability of the result.

Measurement of the Specific BLAINE Surface

The specific surface of the various materials is measured as follows. The Blaine method is used at a temperature of 20° C. with a relative humidity not exceeding 65%, wherein a Blaine apparatus Euromatest Sintco conforming to the European Standard EN 196-6 is used.

Prior to the measurement the humid samples are dried in a drying chamber to obtain a constant weight at a temperature of 50-150° C. The dried product is then ground in order to obtain a powder having a maximum particle size of less than or equal to 80 µm.

EXAMPLES

Materials

The cement used in the example is a Portland cement produced at the Lafarge cement production site of Le Teil, in France. It is a CEM I 52.5N Portland cement. The plasticizer is Bind'R supplied by the company Mapei.

The aluminium sulphate is supplied by the company Sika under the tradename SIKA 40AF or by the company Floerger under the trade name FLOQUAT ASL.

The foaming agent used is MAPEAIR L/LA supplied by the company MAPEI, having a solids content of 26 wt.-%. FOAMCEM LT2 supplied by the company Laston and PROPUMP26 supplied by the company Propump may also be used.

The mineral component is a limestone supplied by the company La Provencale under the tradename Mikhart 1.

Viscosity Modifying Agent (VMA):

The following VMA were tested:

TABLE 1

| Product name | Supplier | Compound | Formulation |
| --- | --- | --- | --- |
| Tylose MH 60001 P4 | SE Tylose Shin-Etsu | Methyl Hydroxy Ethyl Cellulose, | fine powder < 125 µm |
| Tylose MH 30000 YP4 | SE Tylose Shin-Etsu | Methyl Hydroxy Ethyl Cellulose, | fine powder < 125 µm |
| Tylose MH 150000 YP4 | SE Tylose Shin-Etsu | Methyl Hydroxy Ethyl Cellulose, | fine powder < 125 µm |
| Tylose MHS 30027 P6 | SE Tylose Shin-Etsu | Methyl Hydroxy Ethyl Cellulose, | ultrafine powder < 100 µm |
| Culminal C8381 | Ashland | Hydroxypropyl Methyl Cellulose | powder |

TABLE 1-continued

| Product name | Supplier | Compound | Formulation |
| --- | --- | --- | --- |
| Rheovis HS 1980 | BASF | HASE - copolymer acrylic ester methacryclic ester | powder |
| KelcoCrete DG F | CP Keloo | Diutan gum | powder |
| ARIC 4121 | Agrana | Ether from starch | powder |
| Foxcrete S200 | AVEBE | Modified starch | flakes |
| Starvis S39211F | BASF | Synthetic high molecular weight copolymer - swellable polymer | powder |
| Acrysol TT615 | DOW | HASE - modified acrylic polymer | liquid |

Tap water was used in all of the examples.

Equipment:
 The Rayneri mixer:
  A Turbotest mixer (MEXP-101, model: Turbotest 33/300, Serial No.: 123861) supplied by the company Rayneri, which is a mixer with a vertical axis.

Pumps:
 A pump having an eccentric screw conveyer Seepex™ of the type MD 006-24, commission no. 244920.
 A pump having an eccentric screw conveyer Seepex™ of the type MD 006-24, commission no. 278702.

Foamer:
 A foamer comprising a bed of glass beads of the type SB30 having a diameter of 0.8-2.5 mm filled up in a tube having a length of 100 mm and a diameter of 12 mm.

Static Mixer:
 A static mixer comprised of 32 helicoidal elements of the type Kenics having a diameter of 19 mm and referred to as 16La632 at ISOJET.

Preparation of Cement Slurry

For preparing one litre of slurry having a water/cement ratio of 0.32 (the cement being here composed of Portland Cement (CEM I) and limestone mineral component), the following composition was used:

TABLE 2

|  | Amount | Weight percentage wt.-% |
| --- | --- | --- |
| Portland cement (CEM I) | 1422.1 g | 69.1 |
| Limestone mineral component | 135.4 g | 6.58 |
| Superplasticizer | 7.4 g | 0.36 |
| Tap water | 493.2 g | 23.96 |
| Total | 2058.1 g | 100 |

The cement slurries have been prepared by using the mixer Rayneri Turbotest 33/300, into which tap water has first been introduced and then liquid superplasticizer. While mixing at 1000 rpm, the solid components (Portland cement and limestone mineral component) have progressively been added. The cement slurry was then mixed for two additional minutes at 1500 rpm.

Preparation of the Foaming Solution

A foaming solution, i.e. an aqueous solution containing the foaming agents, was prepared using the following amounts of materials.

For one litre of foaming solution:

| MAPEAIR L/LA | 25 g |
| --- | --- |
| Tap water | 975 g |

The foaming solution was pumped by means of a volumetric pump having an eccentric screw conveyor Seed™ MD-006-24 (commission no: 278702).

This foaming solution was introduced into the foamer through the bed of beads by means of pressurized air (1-6 bar) and a T-junction. The aqueous foam was produced in a continuous way at a rate of 8 litres per minute, having a density of 45 kg/m$^3$.

Preparation of an Aqueous Mixture Comprising Aluminium Sulphate and a Viscosity Modifying Agent (VMA)

Different dispersions comprising aluminium sulphate and different viscosity modifying agents were prepared.

The concentration of the dispersion is preferably adjusted to respect both a ratio aluminium sulphate/cement and a ratio VMA/cement in the mineral foam.

For example, starting from an aqueous solution comprising 28 wt.-% aluminium sulphate, and if the target concentrations in the desired mineral foam are a weight ratio aluminium/cement ratio of 0.5% and a weight ratio VMA/cement of 0.03%, a dispersion comprising 0.03×28/0.5=1.68 wt.-% of VMA is to be prepared.

The preparation of the aqueous mixture is easy because the presence of aluminium sulphate prevents solubilisation and thickening.

Depending on the VMA, the aqueous mixture may be in the form of a dispersion. Such dispersion may not be totally stable and some decantation can occur in the time. To avoid such decantation the dispersion may be mixed continuously.

Preparation of the Foamed Cement Slurry (Fresh Mineral Foam)

The aqueous foam as previously obtained, was brought into contact with the cement slurry each other in a static mixer and a foamed cement slurry was obtained. The aqueous dispersion of VMA in the aqueous solution of aluminium sulphate is then injected in the static mixer. The flow rate of the aqueous foam into the static mixer is of 377 g per minute.

The slurry rate is adjusted to obtain the target density of 75 kg/m$^3$.

TABLE 3

| Targeted dry foam density (kg/m³) | 60 | 75 | 100 |
|---|---|---|---|
| Calculated wet density (kg/m³) | 107 | 122 | 148 |
| Flow rate of aqueous foam (g/min) | 377 | 377 | 377 |
| Slurry flow (mL/min) | 270 | 338 | 457 |
| Aluminium sulphate/VMA flow (mL/min) | 5.7 | 7.2 | 9.7 |

The aqueous foam and the cement slurry are injected at the base of the static mixer using a "Y" connector. The dispersion of VMA in the aluminium sulphate solution is injected into the static mixer at ⅔ of its length at a rate of 7.2 ml/min. In the first 2 thirds of the static mixer, the aqueous foam and the slurry are homogenized by the static mixer to produce a foamed cement slurry. The last third part of the static mixer makes it possible to homogenize the foamed cement slurry with the VMA and the aluminium sulphate. A foamed cement slurry comprising VMA and aluminium sulphate is obtained.

At the outlet of the static mixer, the final fresh mineral foam is homogeneous and can be used to fill a building element.

Application of the Foamed Cement Slurry (Fresh Mineral Foam)

Filling of the cavities of the construction element with the mineral foam was performed continuously via a hose moved from one cavity to another. The operation can be manual or it can be automated.

The inner walls were checked manually to verify their dryness, and their water absorption rate estimated or tested with mineral foam in real conditions. In practice, high water absorption is often observed with dry construction elements made with porous materials. Generally, fresh concrete blocks, immediately after manufacture (i.e. before setting and drying) do not exhibit very high-water absorption and can be filled with mineral foam without VMA. However, fresh building elements, made with lightweight aggregates, such as pumice stone or expanded clay, may exhibit high water absorption immediately after manufacture. This water absorption can be high enough to cause the destabilization of a mineral foam that does not contain VMA.

Example 1: Filling of Masonry Bricks in Dry State

The cavities of clay bricks in dry state were filled with the foamed cement slurry. The inner walls of the clay bricks cavities were in dry state and the water absorption value according to standard NF-EN 772-11 was estimated to be close to 0.74 kg/(m²×min) for 1 minute of measurement time (measurement time was stopped after 1 minute since the weight gain measured according to standard NF EN 772-11 was already stabilized after 1 minute). After filling of 2 bricks cavities with foamed cement slurry, the composite insulating brick blocks (1) were placed left in place in situ for 24 hours.

Visual Observations

The aspect of the foamed cement slurry was monitored:
when the foamed cement slurry foam exits the hose. The results are coded as follows: fresh foam with normal aspect+, fresh foam with normal aspect although some heterogeneities are present +−, heterogenous fresh foam −;
after filling in the brick cavities (foam retaining or collapsing). The results are coded as follows: no fresh foam collapsing ++, slight fresh foam collapsing +−, substantial fresh foam collapsing −.

once the foamed cement slurry has set, the inner appearance of the mineral foam (receding, cracks) was observed after scalping at 24 hours. The results are coded as follows: uniform set foam ++, uniform set foam having some cracks but no loosening +−, set foam with important cracks and lack of set foam in the cavities −.

Figure 1B:
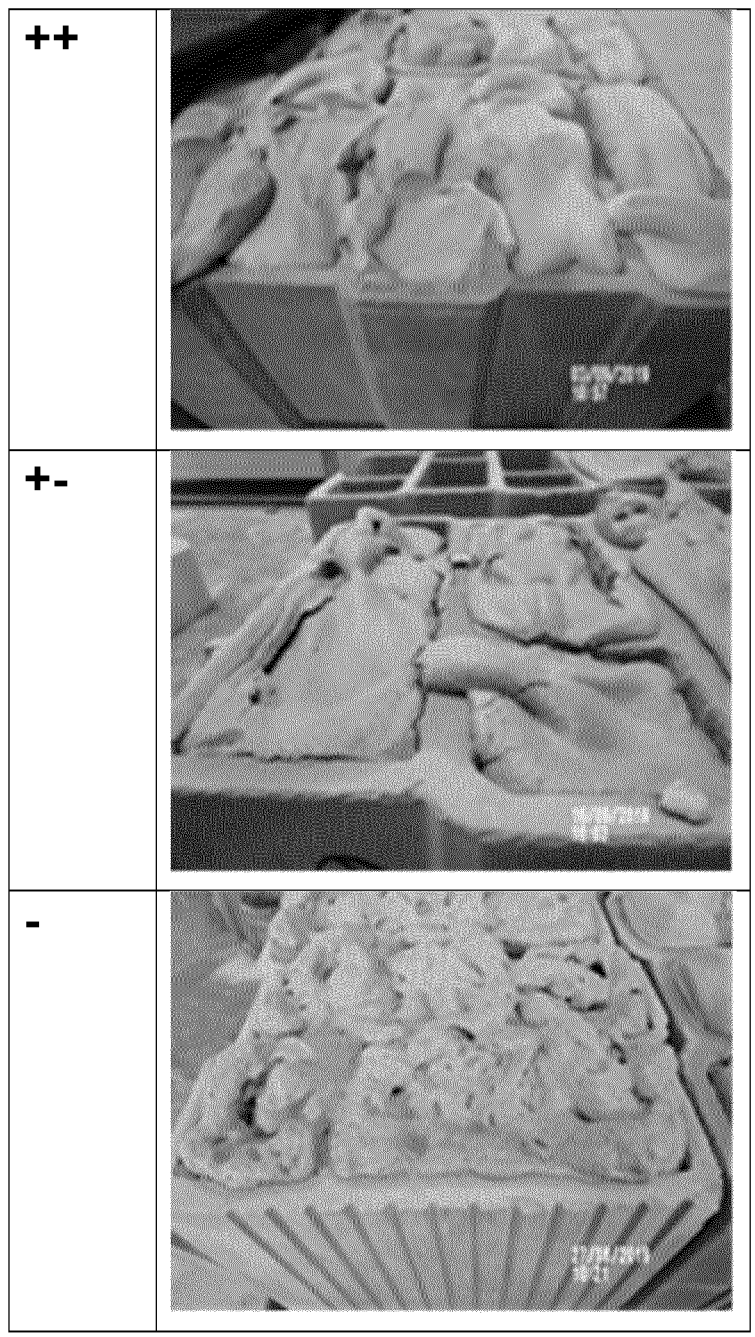
Figure 1C:
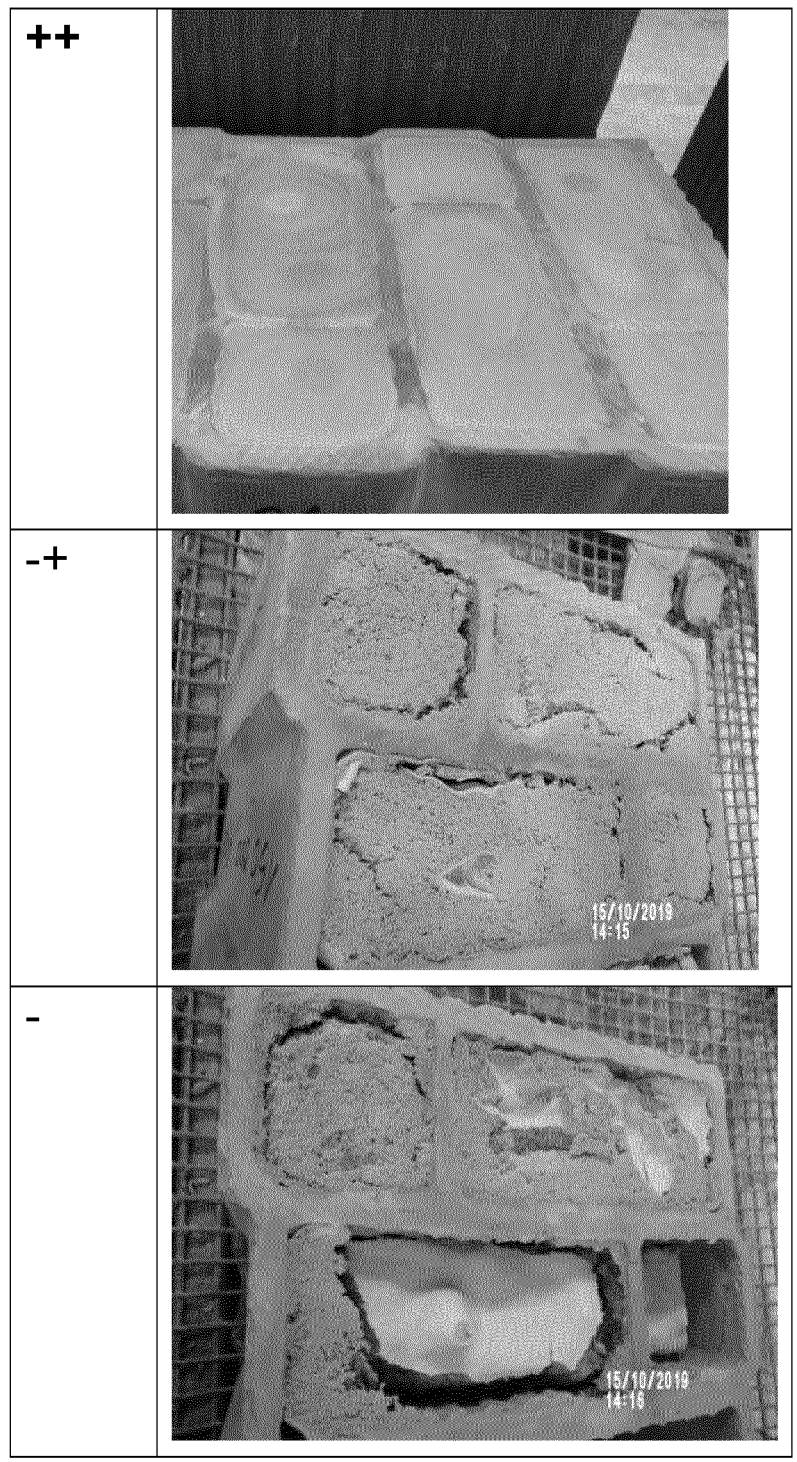

This classification of the results at different stage, namely when the foamed cement slurry exits the hose, after filling the brick cavities and once the foamed cement slurry has set are respectively illustrated in FIG. 1A, FIG. 1B and FIG. 1C.

The results of these visual observation depending on the VMA used and its dosage are given in Table 4 below:

TABLE 4

| | Dosage %/ cement | quality of the foam | collapse of the foam | aspect after scalping |
|---|---|---|---|---|
| Reference | | | | |
| Foamed cement slurry without VMA | | ++ | − | − |
| Examples according to the invention | | | | |
| Tylose MH 60001 P4 | 0.05 | − | −+ | −+ |
| Tylose MH 30000 YP4 | 0.03 | ++ | ++ | −+ |
| | 0.05 | − | ++ | −+ |
| Tylose MH 150000 YP4 | 0.03 | + | + | −+ |
| Tylose MHS 30027 P6 | 0.03 | − | −+ | −+ |
| | 0.01 | − | ++ | −+ |
| Culminal C8381 | 0.03 | −+ | −+ | −+ |
| | 0.05 | −+ | −+ | −+ |
| Comparative examples | | | | |
| Rheovis HS 1980 | 0.01 | ++ | − | − |
| | 0.03 | −+ | − | − |
| KelcoCrete DG F | 0.03 | ++ | − | − |
| ARIC 4121 | 0.01 | ++ | − | ND |
| | 0.03 | −+ | − | |
| Foxcrete S200 | 0.01 | −+ | − | ND |
| Starvis S39211F | 0.01 | −+ | − | ND |
| Acrysol TT615 | The assay was stopped as Acrysol was found to be incompatible with aluminium sulphate. | | | |

The essay using Acrysol TT615 could not be completed because this product shown an incompatibility with aluminium sulphate (immediate flocculation).

Rheovis HS 1980 and the swelling polymer had no effect on foam collapsing.

The starch-based products (ARIC4121, foxcrete S200) and the diutan gum permits to obtain a homogenous fresh foam, but do not sufficiently limit the fresh foam collapsing.

The cellulose ethers permit to obtain homogenous foams. It is worth noting that cellulose ether with delayed viscosity (Tylose 30000 YP4 and Tylose 150000 YP4) present the best results, reaching a compromise between the quality of the fresh foam, the good cohesion with the clay brick inner walls, and the inner aspect of the set foam after scalping.

Setting Time

Tests were carried out using foam with and without VMA to observe the impact of the presence of a VMA on foamed cement slurry setting time.

The results are given in Table 5 below.

TABLE 5

| | Setting time |
|---|---|
| Mineral foam without VMA | 3 h 45 |
| Mineral foam with VMA (0.1% Tylose MHS30027P6/cement) | 3 h 25 |

Mechanical Resistance

Tests were carried out using foam with and without VMA to observe the impact of the presence of a VMA on mechanical resistance of set mineral foam.

The results are given in Table 6 below.

TABLE 6

| | Compressive strength at 14 days EN826 F10 kN |
|---|---|
| Mineral foam without VMA | 0.015 MPa |
| Mineral foam with VMA (0.03% Tylose 30000 YP4/ciment) | 0.02 MPa |

Example 2: Column Stacked Flue Tiles at Dry State

Figure 2A:
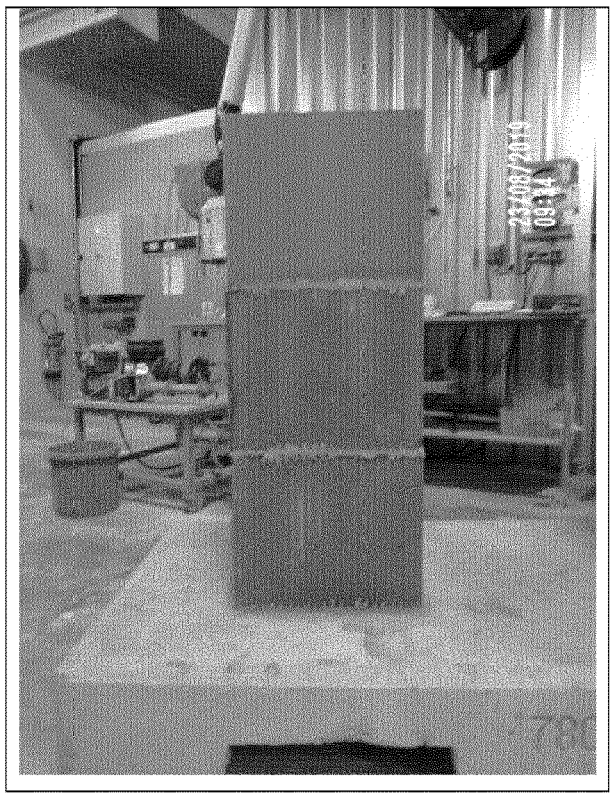
FIG. 2 illustrates the results from Example 2 with a stack of three flue tiles (FIG. 2A) filled with a mineral foam without viscosity modifying agent (FIG. 2B—left) or with a viscosity modifying agent (FIG. 2B—right) at dry state after 24 hours.

A larger scale test was carried out. 2 columns each composed of a stack of 3 flue tiles (FIG. 2A) were respectively filled with mineral foam without VMA and a mineral foam comprising 0.1% Tylose MHS 30027P6/cement. The walls of the flue tiles have a water absorption rate of more than 5 g/(m$^2$·s) at 10 minutes according to standard NF EN 772-11 of august 2011.

Results

Figure 2B:
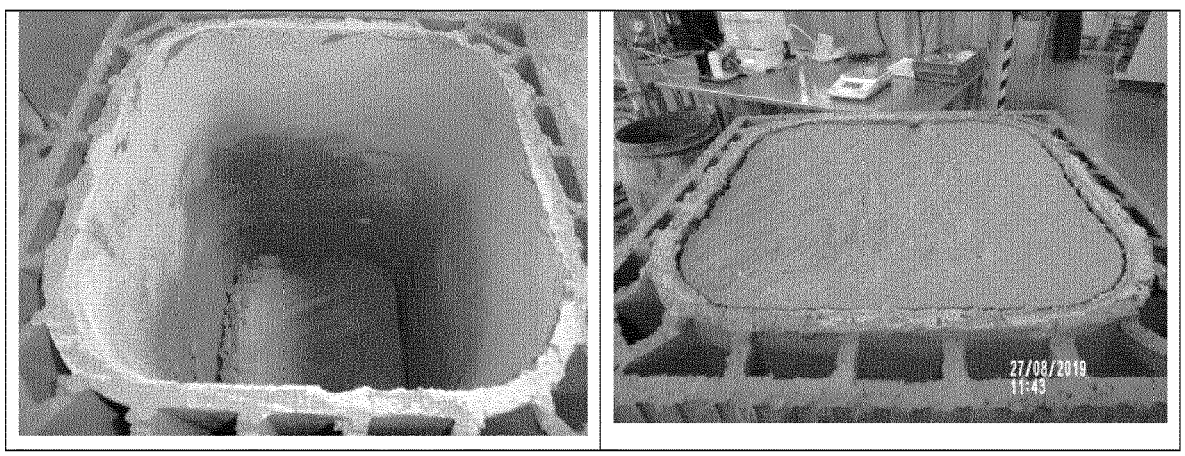

The results show a rapid and significant collapse of the foamed cement slurry without VMA (FIG. 2B left—visual aspect at 24 h), and the absence of collapse at 24 h of the foamed cement slurry comprising 0.1% Tylose MHS 30027P6/cement (FIG. 2B right—visual aspect at 24 h).

The invention claimed is:

1. A method for producing a composite insulating mineral construction element comprising the following steps:
    a) filling a cavity of a construction element comprising at least one cavity delimited by at least one inner wall at least partially having a water absorption rate of more than 5 g/(m$^2$·s) at 10 minutes according to standard NF EN 772-11 of August 2011 with a foamed cement slurry comprising a cement being an hydraulic binder comprising a proportion of at least 50% of calcium oxide CaO and silicon dioxide SiO$_2$, a metal salt selected from an aluminium, magnesium or iron salt and mixtures thereof, and a cellulose ether;
    b) leaving the foamed cement slurry to set within the cavity resulting in the formation of a mineral foam;
    wherein the foamed cement slurry comprises from 0.01 to 0.2% by weight of cellulose ether, relative to the weight of cement.

2. The method according to claim 1, wherein the foamed cement slurry comprises 0.01 to 0.1% by weight of cellulose ether, relative to the weight of cement.

3. The method according to claim 1, wherein the cellulose ether is a an anionic cellulose ether or a nonionic cellulose ether or a mixture thereof.

4. The method according to claim 3, wherein the anionic cellulose ether is carboxymethyl cellulose (CMC), carboxymethyl hydroxyethyl cellulose (CMHEC), carboxymethyl hydroxy-propyl cellulose (CMHPC), sulfoethyl methyl hydroxyethyl cellulose (SEMHEC) or sulfoethyl methyl hydroxypropyl cellulose (SEMHPC).

5. The method according to claim 3, wherein the nonionic cellulose ether is hydroxyethyl cellulose (HEC), hydroxypropyl cellulose (HPC), methyl cellulose (MC), methyl hydroxypropyl cellulose (MHPC), methyl hydroxyethyl cellulose (MHEC), ethyl hydroxyethyl cellulose (EHEC) or methyl ethyl hydroxyethyl cellulose (MEHEC).

6. The method according to claim 1, wherein the cellulose ether is a cellulose ether having a viscosity level comprised between 100 mPa·s to 5000 mPa·s.

7. The method according to claim 6, wherein the cellulose ether has a viscosity level ranging between 300 mPa·s to 1500 mPa·s.

8. The method according to claim 1, wherein the cellulose ether is a cellulose ether with delayed solubility.

9. The method according to claim 1, wherein the foamed cement slurry comprises 0.05% to 5% by weight of metal salt, relative to the weight of cement.

10. The method according to claim 9, wherein the foamed cement slurry comprises 0.15% to 1.5% by weight of metal salt, relative to the weight of cement.

11. The method according to claim 1 wherein the metal salt is a salt of aluminium.

12. The method according to claim 11, wherein the salt of aluminium is aluminium sulphate.

13. The method according to claim 1, wherein the foamed cement slurry used in step a) is obtained by a process comprising:
    (i) separately preparing a cement slurry and an aqueous foam;
    (ii) contacting the cement slurry with the aqueous foam to obtain a foamed cement slurry;
    wherein:
    the cement slurry of step (i) comprises the metal salt, and
    the cellulose ether is comprised within the cement slurry of step (i) and/or is within the aqueous foam of step (i) and/or is added to the foamed cement slurry obtained in step (ii).

14. The method according to claim 13, wherein the cement slurry of step (i) comprises cement and water with a weight water/cement ratio ranging between 0.25 to 0.5.

15. The method according to claim 13, wherein the method comprises a step (iii) of adding a mixture comprising metal salt, cellulose ether and water in the foamed cement slurry obtained in step (ii).

16. The method according to claim 1, wherein the mixture comprises cellulose ether in the form of particles having an average particle size of 125 μm or less.

17. The method according to claim 1, wherein the mineral foam obtained after step b) has one or many of the following features:
    the mineral foam has a density of less than 600 m$^3$/kg;
    the mineral foam comprises from 0.01% to 0.2% by weight of cellulose ether;
    the mineral foam comprises 0.15% to 5% by weight relative to the weight of cement.

18. The method according to claim 1, wherein the mineral construction element is selected from a concrete block, a brick, a double wall, a sandwich panel, a 3D construction wall.

19. A method comprising utilizing a combination of a metal salt and a cellulose ether as defined in claim 1 with a cement being an hydraulic binder comprising a proportion of at least 50% by weight of calcium oxide CaO and silicone dioxide $SiO_2$ for improving the stability of a foamed cement slurry when it comes into contact with a material having a water absorption rate of more than 5 $g/(m^2 \cdot s)$ at 10 minutes according to standard NF EN 772-11 of August 2011.

20. A composite insulating mineral construction element obtained by the method according to claim 1.

* * * * *